United States Patent
Neelam et al.

(10) Patent No.: US 9,455,894 B1
(45) Date of Patent: Sep. 27, 2016

(54) SELECTIVE FAST RE-ROUTE USING FORWARDING PLANE LIVELINESS DETECTION PROTOCOLS

(71) Applicant: Juniper Networks, Inc., Sunnyvale, CA (US)

(72) Inventors: Sairam Neelam, Hyderbad (IN); Prashant Singh, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 176 days.

(21) Appl. No.: 14/039,412

(22) Filed: Sep. 27, 2013

(51) Int. Cl.
*H04L 12/26* (2006.01)

(52) U.S. Cl.
CPC .................. *H04L 43/0888* (2013.01)

(58) Field of Classification Search
CPC .................................................... H04L 43/0888
USPC ........................................................ 370/252
See application file for complete search history.

(56) References Cited

U.S. PATENT DOCUMENTS

| | | |
|---|---|---|
| 7,184,437 B1 | 2/2007 | Cole et al. |
| 8,077,726 B1 | 12/2011 | Kumar et al. |
| 8,339,959 B1 | 12/2012 | Moisand et al. |
| 2007/0014231 A1* | 1/2007 | Sivakumar et al. .......... 370/216 |
| 2009/0225650 A1* | 9/2009 | Vasseur ......................... 370/218 |
| 2009/0279440 A1* | 11/2009 | Wong et al. .................. 370/242 |

OTHER PUBLICATIONS

Katz et al., "Bidirectional Forwarding Detection (BFD)," Internet Engineering Task Force (IETF), RFC 5880, Juniper Networks, Jun. 2010, 50 pp.
Katz et al., "Bidirectional Forwarding Detection," draft-ietf-bfd-base-06.txt, Network Working Group, Internet Draft, Mar. 2007, 49 pp.

* cited by examiner

*Primary Examiner* — Wei Zhao
(74) *Attorney, Agent, or Firm* — Shumaker & Sieffert, P.A.

(57) ABSTRACT

Techniques are described for selectively triggering fast reroute of traffic by enhancing a protocol used for monitoring operational status of a forwarding plane of a router. The forwarding plane of the router outputs periodic messages that, when received by a peer router, provide an indication that the forwarding plane is operational and able to forward packets. In addition, when constructing the periodic messages, the forwarding plane embeds an indication of a status of internal communication between the forwarding plane and a control plane of the router. In this way, the forwarding plane of the transmitting router provides an indication to the peer router that, although operational, the forwarding plane may be operating according to stale forwarding information.

16 Claims, 5 Drawing Sheets

SELECTIVE FAST RE-ROUTE USING FORWARDING PLANE LIVELINESS DETECTION PROTOCOLS

TECHNICAL FIELD

This disclosure relates generally to computer networks, and more specifically, to periodic communications, such as communications for forwarding path liveliness detection, between devices in a computer network.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes available routes through the network. Each route defines a path between two locations on the network. Upon receiving an incoming packet, the router examines information within the packet and forwards the packet in accordance with the routing information. In order to maintain an accurate representation of a network, each router typically executes one or more routing protocols in a "control plane" of the device. By execution of the routing protocols, the routers maintain control-plane communication sessions through which the routers exchange routing information that reflects the current topology of the network.

SUMMARY

In general, techniques are described for selectively triggering fast reroute of traffic. For example, techniques are described in which a protocol used for monitoring operational status of a forwarding plane of a router is enhanced to carry additional information as to a status of an internal communication between the forwarding plane and a control plane of the router.

For example, periodic messages sent by a router in accordance with the forwarding plane liveliness detection protocol may provide an indication that the forwarding plane of a router is operation and able to forward packets. The addition information embedded within the periodic messages may, however, indicate that internal communication between the forwarding plane and the routing plane of the router has been lost and, therefore, the forwarding information currently being used by the forwarding plane has become stale. Due to the short periodicity of the forwarding plane detection protocol (e.g., on the order of a few tens of milliseconds), peer routers may quickly determine whether to reroute traffic around the router even though the router is able to forward traffic. Moreover, by using a forwarding plane detection protocol to carry embedded information as to the state of internal communications between the forwarding plane and the routing plane, peer routers may be informed of a failure or loss of communication with the control plane than by relying on any timeout of routing protocol peering sessions, which may take several seconds.

In one example, a method comprises executing, within a routing component of a network device, one or more routing protocols to exchange network topology information with one or more other network devices and to program a packet forwarding component of the network device to forward packets in accordance with the network topology information. The method includes detecting, with the packet forwarding component, a status of internal communication between the packet forwarding component of the network device and the routing component of the network device. Further, the method includes constructing, with the packet forwarding component, a periodic message in accordance with a forwarding-plane liveliness detection protocol. The packets comprise an indication of the detected status of the internal communication between the routing component and the packet forwarding component of the network device. In addition, the method includes outputting, by the packet forwarding component, the periodic message to a peer network device in accordance with the forwarding plane liveliness detection protocol.

In another example, a network device comprises a routing component having a hardware-based processor to execute one or more routing protocols to exchange network topology information with one or more other network devices, and a packet forwarding component of the network device programmed by the routing component to forward packets in accordance with the network topology information. The network device includes a communication link internal to the network device for conveying communications between the routing component and the packet forwarding component. The packet forwarding component detects a status of the internal communication link and constructs a periodic message in accordance with a forwarding-plane liveliness detection protocol. Moreover, the packet forwarding component constructs the packet to comprise an indicator of the detected status of the communication link between the routing component and the packet forwarding component of the network device. The packet forwarding component outputs the periodic message to a peer network device in accordance with the forwarding plane liveliness detection protocol.

In another example, a network device comprises a routing component includes a hardware-based processor to execute one or more routing protocols to exchange network topology information with one or more other network devices, and a packet forwarding component of the network device programmed by the routing component to forward packets in accordance with the network topology information. The packet forwarding component executes a forwarding-plane liveliness detection protocol to receive a periodic message from a peer network device, the periodic message comprising an indicator of a status of communication between a control plane and a forwarding plane of peer network device. The packet forwarding component reroutes one or more packet flows to bypass the peer network device when the forwarding plane of the peer network device is no longer in communication with the control plane of the peer network device.

The details of one or more examples are set forth in the accompanying drawings and the description below. Other features, objects, and advantages of this disclosure will be apparent from the description and drawings, and from the claims.

DETAILED DESCRIPTION

Figure 1:
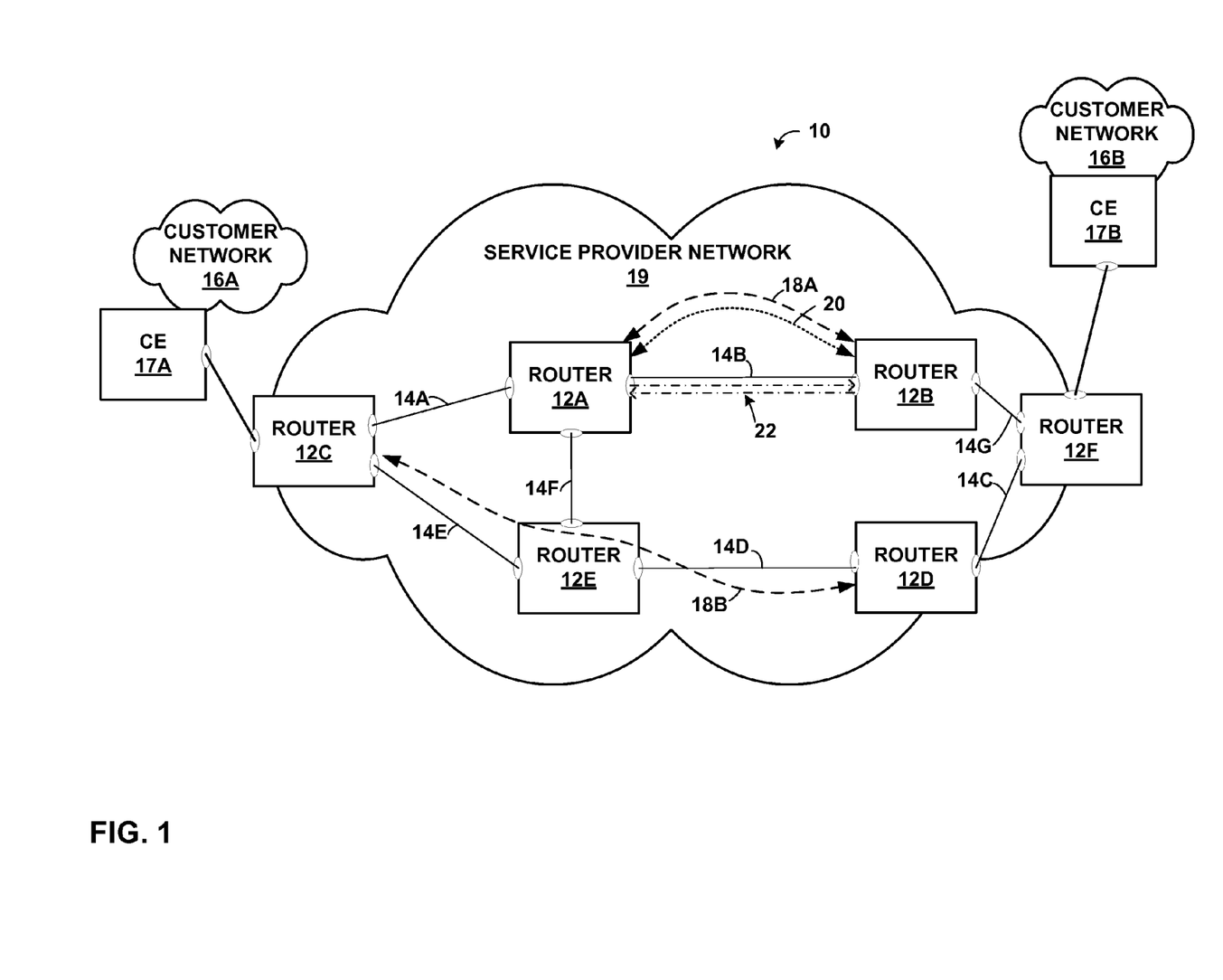
FIG. 1 is a block diagram illustrating an example network system in which techniques described herein may be implemented.

FIG. 1 is a block diagram illustrating an example network system 10 in which the techniques described herein may be implemented. In this example, network system 10 includes service provider network 19, which is communicatively coupled to customer networks 16A and 16B ("customer networks 16"). In turn, service provider network 19 includes routers 12A-12F ("routers 12"), which operate and interact with one another in accordance with the techniques described herein. Routers 12 are communicatively coupled to one another, either directly, or indirectly, via physical links 14A-14G ("links 14"). Links 14 represent any physical medium, such as a copper wire, a coaxial cable, any of a host of different fiber optic lines, a wireless connection, and various combinations thereof. In the specific example of FIG. 1, routers 12C and 12F represent edge routers. More specifically, routers 12C and 12F provide an interface between service provider network 19 and respective customer networks 16.

Additionally, customer networks 16 include respective customer edge routers 17A and 17B ("CE routers 17"). As shown, each of CE routers 17 is linked to a respective edge router of routers 12. Edge routers 12C and 12F communicate with CE routers 17 to provide customer networks 16 with access to service provider network 19. As shown, each of customer networks 16 may be a network for a site of an enterprise. Each of customer networks 16 may include one or more computing devices (not shown), such as personal computers, laptop computers, handheld computers, workstations, servers, switches, printers, or other devices. Service provider network 19 may be coupled to one or more networks administered by other service providers, and may thus form part of a large-scale public network infrastructure, e.g., the Internet. Consequently, customer networks 16 may be viewed as edge networks of the Internet.

The service provider may provide computing devices within customer networks 16 with access to the Internet via service provider network 19, which allows computing devices within one of customer networks 16 to communicate with computing devices within the Internet or the other one of customer networks 16. FIG. 1 may be a simplified view of network system 10. For instance, service provider network 19 can include a variety of other network devices (not shown), such as routers, switches, servers, and the like and may be connected to other networks. In contrast to edge routers 12C and 12F, the remainder of routers 12 represents intermediate routers. More specifically, intermediate routers 12A, 12B, 12D, and 12E provide various communication channels between edge routers 12C and 12F.

Routers 12 execute more control-plane routing protocols to maintain accurate representation of the topology of service provider network 19. For example, routing engines within routers 12 maintain peering sessions with each other and exchange routing information for routes or links within service provider network 19 in accordance with one or more routing protocols. In the example of FIG. 1, routers 12A, 12B are shown as maintaining a control-plane communication session 18A for exchanging routing information. Similarly, routers 12C, 12D are shown as maintaining a control-plane communication session 18B for exchanging routing information. Although only shown by way of example with respect to routers 12A, 12B and 12C, 12D, other combinations of routers 12, 17 typically maintain control-plane communication sessions for exchanging routing information using various routing protocols. Example protocols include the Border Gateway Protocol (BGP) distance vector routing protocol and the Open Shortest Path First (OSPF) and Intermediate System-to-Intermediate System (IS-IS) link state routing protocols.

In association with the control plane sessions for conveying network topology information, routers 12 may periodically send status inquiries (e.g., send "periodic packets" or "periodic data") to one another in order to provide and continue to prove/verify the control plane communication between the peer routers. That is, by sending periodic packets and detecting receipt of similar periodic packets, routers 12 detect any failures in control plane communications between the peer routers, either as a result of failure of an internal routing engine or given routing protocol of one or more of routers 12 or due to failure of links 14 or other infrastructure between the peer routers. In this example of FIG. 1, control plane components of routers 12A, 12B are shown as exchanging periodic packets 20 for continuing to verify control plane communications between the routers. Although not shown, other routers 12 typically exchange periodic packets between respective control plane components (e.g., routing components) in accordance with control plane protocols for verifying control plane connectivity between the routers.

Each router typically maintains a relatively long timeout value in association with the monitoring of control plane connectivity, such as three to twenty seconds or more as examples. Upon detecting loss of control plane communication, the detecting router 12 may elect to update one or more internal representations of the topology of service provider network 19, and outputs session messages to the other routers 12 to inform the other routers 12 of the topology changes. For example, upon detecting loss of control plane communication with router 12B by way of periodic packets 20, router 12A may elect to update its routing information so as to direct packets destined for customer network 16B to router 12E, thereby routing around router 12B.

In some cases, router 12B may support various features such as "non-stop forwarding" and "graceful restart." For example, packet forwarding components (e.g., hardware-based packet forwarding engines) of router 12B may support "non-stop forwarding" and, therefore, is capable of continuing to forward packets even though the control plane of router 12B may no longer be operational. This allows the packet forwarding components of router 12B to forward packets in accordance with its last know state as to the topology of service provider network 12. As such, even though the control plane of router 12B may be out of communication, the forwarding plane of router 12B continues operation in uninterrupted fashion. Moreover, the control plane of router 12B may support "graceful restart," which refers to the capability of preserving the forwarding information while restarting a routing communication session, e.g., a BGP session, in the control plane. In other words, even though router 12B may have lost control plane communication via session 20, router 12B may be able to continue to forward packets and may, upon restoring control plane functionality, may be able to restart certain control plane routing protocols without substantially disrupting routing services. As such, by way of periodic packets 20, router 12A may detect loss of control plane communication with router 12B but typically only after a significant period of time (e.g., after reaching a threshold timeout value of 3-20 seconds or more). In response, router 12A may direct traffic around 12B or may elect to defer redirection when router 12B supports features such as non-stop forwarding and graceful restart; however, in either case the forwarding plane of router 12B may have been utilizing state forwarding information for some time prior to detection of the loss of control plane communication between the routers.

In addition to utilizing protocols and corresponding periodic packets for monitoring an ability to communicate directly between control plane components, routers 12 may separately execute other protocols to monitor operation of the underlying packet forwarding components (also referred to as packet forwarding engines or a "forwarding plane") to confirm that the forwarding components of the routers are currently able to forward packets. In the example of FIG. 1, routers 12A and 12B exchange periodic packets 22 (also referred to as "periodic messages") to detect the liveliness of the forwarding plane of each other, and the routers may exchange packets 22 for detecting forwarding plane liveliness at a rate that is significantly faster (e.g., every 10-50 ms) than the rate at which the routers exchange packets 20 (e.g., 3-20 seconds) for monitoring control plane communication capability between the routers. Protocols for monitoring the operation of packet forwarding components may generally be referred to as forwarding plane liveliness detection protocols.

When a periodic packet associated with a forwarding plane liveliness detection protocol is not received in the allotted time frame, a packet forwarding component of the router expecting receipt of the periodic packet determines that a network event has occurred causing the forwarding plane of the peer router to be unable to process packets. In such case, the router may elect to immediately reroute traffic around the peer router since the peer router is no longer forwarding packets. For example, router 12A may, upon detecting failure lack of responsiveness from the forwarding plane of router 12B via periodic packets 22, immediately reroute traffic around router 12B since the forwarding plane of router 12B appears to no longer be forwarding packets. One exemplary forwarding plane liveliness detection protocol is the bidirectional forwarding detection (BFD) protocol. The BFD protocol provides a very short interval of time between which the forwarding plane of routers 12 must transmit periodic messages, and thus may facilitate a fast detection of failures by packet forwarding engines for any of routers 12 that are in active BFD sessions. Further details of the BFD protocol may be found in the proposed standard for BFD, by D. Katz and D. Ward (Juniper Networks, June 2010, ISSN: 2070-1721), the entire content of which is incorporated herein by reference.

In general, techniques are described that provide selective triggering of fast reroute of network traffic. More specifically, a forwarding plane liveliness detection protocol used for monitoring operational status of a forwarding plane of a router is enhanced in accordance with the techniques described herein. With respect to the example of FIG. 1, period packets 22 output by router 12B not only provide an indication to router 12A of the operational status of the forwarding plane of router 12B but have been enhanced to carry additional information to indicate a status of internal communication between the forwarding components of router 12B and the routing components of router 12B. For example, receipt of packets 22 by router 12A in accordance with the forwarding plane liveliness detection protocol provides an indication that the forwarding plane of router 12B is operation and able to forward packets. Moreover, packets 22 include additional information as to whether the forwarding plane of router 12B is internally in communication with the control plane of router 12B, thereby providing an indication of whether the forwarding information used by the forwarding plane remains current or may become stale due to loss of communication internal to router 12B. Further, due to the short periodicity of the forwarding plane detection protocol (e.g., on the order of a few tens of milliseconds), peer router 12A may be informed more quickly of an impending loss of communication with the control plane of router 12B than via periodic packets 20 that are concerned with control plane connectivity between the routers and typically has a much longer refresh period. As such, by leveraging and enhancing use of a liveliness detection protocol executing in the forwarding plane, router 12A may more quickly determine whether to reroute traffic around router 12B even in situations where the forwarding plane of router 12B is still able to forward traffic. In this way, by using a forwarding plane detection protocol to carry embedded information as to the state of internal communications between the forwarding plane and the routing engine, peer routers 12 may be more quickly informed of a failure or loss of communication in the control plane than by relying on any timeout of routing protocol peering sessions, which may take several seconds.

Leveraging a forwarding path liveliness detection protocol to convey in internal state of communications between the forwarding plane (e.g., a packet forwarding component) and a control plane (e.g., a routing component) of a router may provide certain advantages. For example, by providing such an indication, peer routers are informed quickly as to whether the forwarding information of that router remains current or may quickly become stale. This, in turn, allows peer routers to quickly make informed decisions regarding selectively triggering fast reroute with respect to the peer router.

For example, with respect to FIG. 1, in the event router 12A learns by way of packets 22 that the forwarding components of router 12B, although operational, are no longer internally in communication with control plane components of router 12B then router 12A may take certain actions. As one example, router 12A may selectively trigger fast re-route of certain types of traffic, e.g., high-priority traffic destined for customer network 16B, that must be guaranteed to reach the destination. In this case, since router 12A has been informed that router 12B is using stale forwarding information, router 12A may elect to immediately re-route such traffic around router 12B so as to reduce the likelihood of any future disruption due to the inability of router 12B to react to future topology changes.

As another example, router 12A may elect to maintain traffic flow, for at least some traffic flows, through router 12B to take advantage of any "non-stop forwarding" and graceful restart features of router 12B. However, router 12A may initiate a timer to limit the exposure of the traffic being forwarded according to stale forwarding information used by router 12B. For example, upon being informed that router 12B is using stale forwarding information, router 12A may initiate the timer. Upon reaching a threshold amount of time (e.g., 1 minute) throughout which packets 22 indicated that internal communication has not been reestablished between the forwarding component and control plane of router 12B, router 12A may elect to reroute some or all traffic around router 12B. In some cases, router 12A may utilize a plurality of timers with respective timeout values for controlling the selective reroute of traffic of different classes, priorities, forwarding equivalence classes (FECs), subscribers or the like.

In general, internal communication between a forwarding component and a routing component may be lost, and therefore lead to stale forwarding information, in a variety of situations. For example, in situations where a router, such as router 12B, has a primary routing engine and one or more backup routing engine, situations may arise when all of the routing engines have failed or, in some cases, a backup routing engine is not in an operational state yet to takeover operation when the primary routing engine has failed. As another example, the routing engine(s) of the router may be undergoing an in-service software upgrade (ISSU), where loss of communication between the routing engines and the forwarding components may be considerable and, therefore, the router being upgraded may utilize non-stop forwarding in the forwarding plane using stale forwarding information for a significant period of time.

As another example, an individual routing protocol process executing in the control plane may crash or otherwise terminate execution and, therefore, not able to update the forwarding information in the forwarding plane. Similarly, internal communication congestion between the control plane and forwarding plane may lead to loss of internal connectivity.

By leveraging forwarding path liveliness detection protocols to provide an indication of a current status of internal communication between forwarding components and control-plane routing components of a router, peer routers are able to quickly and selectively trigger fast re-route of traffic.

Although described herein with reference to the BFD protocol as an example, the techniques may be applied with other protocols (e.g., layer two or layer three protocols) that execute in the forwarding plane or are otherwise delegated to the forwarding plane and that utilize period messages to indicate forwarding plane connectivity. Other example forwarding plane liveliness detection protocols that may be used could, for example, be OAM (Operations, Administration and Management) protocols that may be used to verify forwarding plane connectivity. Moreover, the techniques may be applied to instances where routers 12 employ the BFD protocol, for example, in conjunction with other control plane protocols, such as routing protocols like BGP, OSPF or IS-IS. In situations where multiple protocols are sharing one or more common BFD sessions, peer routers, and protocols executed by those protocols, can respond differently to an indication that a forwarding plane of a peer router has lost internal connectivity to its control plane. Furthermore, in the event no existing BDF sessions between certain pairs of routers 12, BFD sessions may be established between the routers using topology information learned by other protocols executing in the control plane, such as IGP, BGP or EGP routing protocols. Once established, the BFD sessions may execute in forwarding components of the routers to exchange enhanced periodic messages as described herein.

Figure 2:
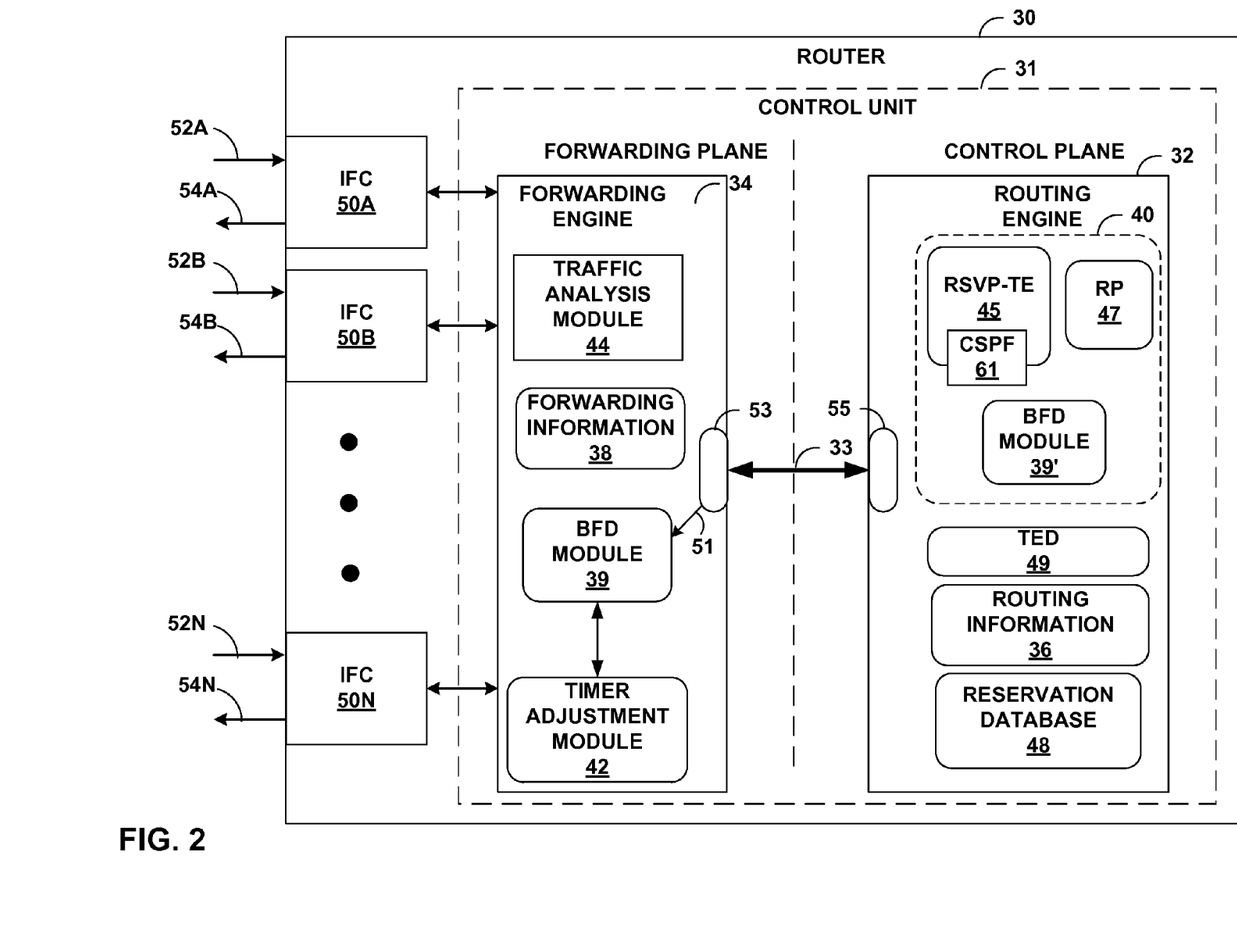
FIG. 2 is a block diagram illustrating an exemplary router in accordance with the disclosure herein.

FIG. 2 is a block diagram illustrating exemplary router 30 in accordance with the disclosure herein. Router 30 provides an example implementation of a router that may implement the techniques described herein. For example, router 30 may be of any of routers 12 illustrated in FIG. 1. While router 30 illustrates one possible router implementation to perform the techniques described herein, it will be appreciated that various other implementations are possible in accordance with this disclosure.

In this example, router 30 includes a control unit 31 that comprises a routing engine 32 that provide control plane functionality and a packet forwarding engine 34 that provides forwarding plane functionality. In addition, router 30 includes a set of interface cards (IFCs) 50A-50N (collectively, "IFCs 50") for communicating packets via inbound links 52A-52N (collectively, "inbound links 52") and outbound links 54A-54N (collectively, "outbound links 54").

Routing engine 32 primarily provides an operating environment for execution of control plane protocols, such as those included in protocols 40. For example, one or more routing protocols ("RP") 47 maintains routing information 36 to reflect the current topology of a network and other network entities to which it is connected. In particular, RP 47 may communicate with protocols executing in the control plane of other routers to exchange topology information or others state information for a computer network and, based on the exchanged communication, update routing information 36 to accurately reflect the topology of the network and other entities. Example routing protocols include Multi-Protocol Border Gateway Protocol (mpBGP), the Intermediate System to Intermediate System (ISIS) routing protocol, the Open Shortest Path First (OSPF) routing protocol and the like.

As shown in FIG. 2, routing engine 32 and forwarding engine 34 internally communicate within router 30 via communication link 33. As one example, internal communication link 33 may be a high-speed Ethernet-type network connection. In this example, each of forwarding engine 34 and routing engine 32 may incorporate network interface hardware and corresponding software providing a network stack so as to allow the components to communicate with each via one or more internal network communication sessions, such as Transmission Control Protocol (TCP) sessions.

Internal communication link 33 provides bi-directional communication between forwarding engine 34 and routing engine 32. For example, inbound control-plane communications conveying topology information from other peer routers are received on interface cards 50 and forwarded to the routing engine via internal communication link 33. In response, routing engine 32 processes the control plane packets to update routing information 36, generates forwarding information in the control plane and, by way of the internal communication link 33, programs the forwarding engine 34 with forwarding information 38 that associates network destinations with specific next hops and corresponding interface ports of IFCs 50 in accordance with routing information 36. Routing engine 32 may generate forwarding information 38 in the form of a radix tree having leaf nodes that represent destinations within the network. In this way, internal communication link 33 allows routing engine 32 of the control plane to update forwarding information 38 within the forwarding plane in response to control-plane messages received from peer routers, thereby preventing the forwarding information from becoming stale.

Based on forwarding information 38, forwarding engine 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution, the contents of which is incorporated herein by reference in its entirety.

In one example, forwarding engine 34 is a rich and dynamic shared forwarding plane, optionally distributed over a multi-chassis router. Moreover, forwarding plane 34 may be provided by dedicated forwarding integrated circuits normally associated with high-end routing components of a network router. Further details of one example embodiment of router 30 can be found in U.S. Provisional Patent Application 61/054,692, filed May 20, 2008, entitled "STREAMLINED PACKET FORWARDING USING DYNAMIC FILTERS FOR ROUTING AND SECURITY IN A SHARED FORWARDING PLANE," which is incorporated herein by reference.

As shown in FIG. 2, protocols 40 executing within routing engine 32 include one or more MPLS protocols for engineering traffic flows to flow along particular paths. For example, RSVP-TE 45 may generate and maintain a traffic engineering database 49, including bandwidth reservations for paths associated with a network, such as service provider network 20 of FIG. 1. Constrained Shortest Path First (CSPF) process 61 computes a shortest path or paths for a communication session based on specified constraints and bandwidth availability information associated with the links within the network. RP 47 may, in turn, advertise the calculated bandwidth availability information in TED 49 to other peer routers. In response to topology changes, RSVP-TE 45 and/or RP 47 may elect to select different paths in accordance with updated routing information 36, generate updated forwarding information 38 and program the forwarding information into forwarding engine 34 by way of internal communication link 33.

Moreover, as shown in FIG. 2, forwarding engine 34 includes BFD module 39 that is enhanced in accordance with the techniques described herein. In some cases, BFD module 39 of forwarding engine 34 may be configured by BFD module 39' or similar logic (not shown) executing in the control plane. Moreover, BFD module 39 may execute on any of IFCs 50 that utilize BFD protocol-based techniques to exchange BFD packets with peer devices to monitor the liveliness of the forwarding plane.

In general, BFD module 39 implements BFD protocol-based functionalities, such as transmitting and monitoring for periodic BFD packets in the data-plane, thereby conserving resources that would otherwise be expended by routing engine 32. In case of a detected connectivity failure, BFD module 39 may be configured to output a failure notification, or other similar indication. In some examples, forwarding engine 34 responds to the failure notification by triggering pre-programmed actions, such as rerouting traffic or initiating one or more timers. In other example, BFD module 39 outputs the failure indication to BFD module 39' or another component of routing engine 32. In response to receiving the failure notification from BFD module 39 of forwarding engine 34, BFD module 39' or another component of routing engine 32 causes RP 47 to update the network topology currently stored to routing information 36, to reflect the failed link(s) represented by the BFD failure.

In accordance with the techniques described herein, BFD module 39 has been enhanced to generate outbound BFD packets so as to include additional information that provides an indication of the status of internal communications between the forwarding components (e.g., forwarding engine 34 and/or IFCs 50) and the control plane (e.g., routing engine 32) of router 32. For example, as a forwarding-plane liveliness detection protocol, outbound packets generated by BFD module 39 may provide other routers an indication that the forwarding plane of router 32 is operational and able to forward packets. Moreover, the outbound BFD packets also embed additional information that provides a current status of whether internal communications with routing engine 32 are operational or whether communication has been lost and, therefore, forwarding information 38 of the forwarding plane may become stale since routing engine 32 is unable to update the information.

In one example, BFD module 39 constructs the BFD packets to embed additional information based on a status signal 51 received from internal communication interface 53. For example, as communication interface 53 successfully sends and receives communications with counterpart internal communication interface 55 of routing engine via internal communication link 33, communication interface 53 may maintain status signal 51 at a level or value indicative of the current operation status. However, in the event communication interface 53 detects a failure of communication between forwarding engine 34 and routing engine 32, the communication interface sets status signal 51 to a different level or value to indicate that communication has been lost. For example, communication interface 53 may detect a failure of routine engine 32 to respond (e.g., due to a hardware failure or failed execution of a protocol 40) or acknowledge a recent communication. As another example, communication interfaces 53, 55 may run internal hello messages, e.g., TCP keepalives, on communication link 33 and communication interface 53 may detect a loss of communication based on failure to receive one or more hello messages within a defined threshold, such as 1-5 ms. As yet another example, a component of routing engine 32 may output a command informing forwarding engine 34 of an impending loss of internal communication, such as a planned or recently initiated software upgrade to routing engine 32. In any of these cases, BFD module 39 constructs and outputs BFD packets to include additional information that, although forwarding engine 34 may be able to continue to forward packets in accordance with forwarding information 38, internal communication with routing engine 32 has been lost and, as such, the forwarding information may become stale.

The architecture of router 30 illustrated in FIG. 2 is shown for exemplary purposes only. In other embodiments, router 30 may be configured in a variety of ways. In one embodiment, for example, control unit 31 and its corresponding functionality may be distributed within IFCs 50. Control unit 31 may be implemented solely in software, or hardware, or may be implemented as a combination of software, hardware, or firmware. For example, control unit 31 may include one or more processors which execute software instructions. In that case, the various software modules of control unit 31, such as protocols 40, may comprise executable instructions stored on a computer-readable medium, such as computer memory or hard disk.

Figure 3:
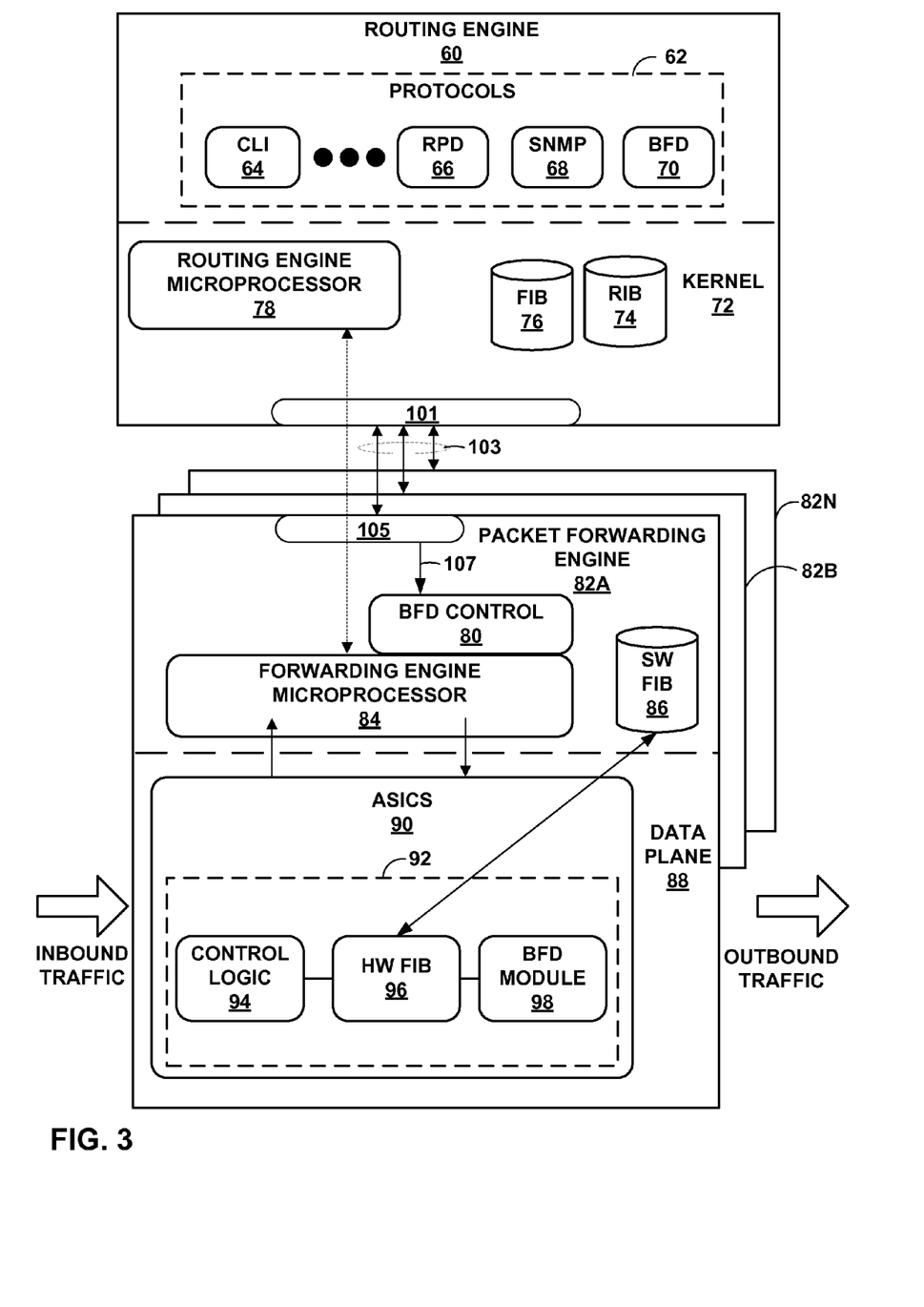
FIG. 3 is a block diagram illustrating further details of a routing engine and a packet-forwarding engine of a router, in accordance with one or more aspects of this disclosure.

FIG. 3 is a block diagram illustrating further details of an example routing engine 60 and an example packet-forwarding engine 82A of router having a plurality of forwarding engines 82A-83N. The components of FIG. 3 may, for example, represent a more detailed example of any of routers 12 of FIG. 1 or router 30 of FIG. 2.

In this example, routing engine 60 includes high-level, control plane software processes 62. In this example, software processes include command-line interface daemon 64 ("CLI 64"), routing protocol daemon 66 ("RPD 66"), and Simple Network Management Protocol daemon 68 ("SNMP 68"). In this respect, routing engine 60 may provide routing plane, service plane, and management plane functionality for the router. Various instances of routing engine 60 may include additional software processes 62 not shown in FIG. 3 that perform other control, management, or service plane functionality and/or drive and otherwise manage data plane functionality for router 30.

RPD 66 interacts with kernel 72 (e.g., by way of API calls) to update routing information base (RIB) 74 based on routing protocol messages received by router 30. RPD 66 may, for example, execute various routing protocols, such as LDP and RSVP to establish LSPs within a network. RIB 74 may include information defining a topology of a network, including one or more routing tables and/or link-state databases. Kernel 43 executes on routing engine microprocessor 78 and may comprise, for example, a UNIX operating system derivative such as Linux or Berkeley Software Distribution (BSD). Kernel 72 processes kernel calls from RPD 66 and generates forwarding information in the form of FIBs 76 based on the network topology represented in RIB 74, i.e., performs route resolution. Typically, RPD 66 generates FIB 76 in the form of radix or other lookup tree to map packet information (e.g., header information having destination information and/or a label stack) to next hops and ultimately to interface ports of interface cards associated with respective PFEs 82. Routing engine microprocessor 78 of kernel 72 then communicates with communication interface 105 of PFE 82A by way of communication interface 101 and internal communication link 103. Routing engine microprocessor 78 may program PFEs 82 and install copies of the FIBs as software FIB 86. Microprocessor 78 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, ASICs 90 are microcode-controlled chipsets programmably configured by a forwarding engine microprocessor 84 executing on each of PFEs 82A-82N (e.g., PFE 82A). Specifically, one or more of ASICs 90 is controllable by microcode 92 programmed by forwarding engine microprocessor 84. The forwarding engine microprocessor 84 programs a hardware FIB 96 into internal memory of ASIC 90 within the data plane 88 based on software FIB 86. When forwarding packets, control logic 94 traverses HW FIB 96 and, upon reaching a FIB entry for the packet (e.g., a leaf node), microcode-implemented control logic 94 automatically selects a forwarding next hop and processes the packets in accordance with the operations defined within the next hop. Additionally, microcode 92 includes BFD module 98, which implements various functionalities in accordance the BFD protocol. As examples, BFD module 98 outputs enhanced BFD packets to embed status information as to communications between PFE 82A and routing engine 60.

Command line interface daemon 64 ("CLI 64") provides an interface by which an administrator or other management entity may modify the configuration of router 30 using text-based commands. Simple Network Management Protocol daemon 68 ("SNMP 68") comprises an SNMP agent that receives SNMP commands from a management entity to set and retrieve configuration and management information for router 30. Using CLI 64, SNMP 68, and BFD 70, management entities may enable/disable and configure services, install routes, enable/disable and configure rate limiters, and configure interfaces, for example. RPD 66, CLI 64, SNMP 68, and BFD module 70 configure router 30 to implement configured services, add/modify/delete routes, and otherwise modify packet forwarding paths by installing forwarding structures to PFEs 82.

In accordance with the techniques described herein, forwarding engine microprocessor 84 implements BFD control 80. BFD control 80, in turn, implements one or more of the techniques described herein. More specifically, microcode-implemented BFD module 98 is configured by BFD control 80, responsive to signal 107, to generate outbound BFD packets to include an indication as to the status of internal communications between PFE 82A and routing engine 60. Moreover, BFD module 98 may, when processing inbound BFD packets, extract information as to the internal communication status of peer routers and provide such information to control logic 94 of ASICs 90 to trigger a fast reroute and/or to BFD control 80 for relaying to routing engine 60. For example, upon detecting via an inbound BFD packet that a forwarding component of a peer router remains operational but is utilizing stale forwarding information due to loss of communication with an internal routing engine, any of control logic 94 of forwarding ASICs 90, forwarding engine microprocessor 84, and/or routing engine 60 may selectively trigger a fast reroute of traffic, initiate one or more timers for subsequent rerouting of traffic or take other actions in response to the indication that the peer router is utilizing stale routing information.

Figure 4:
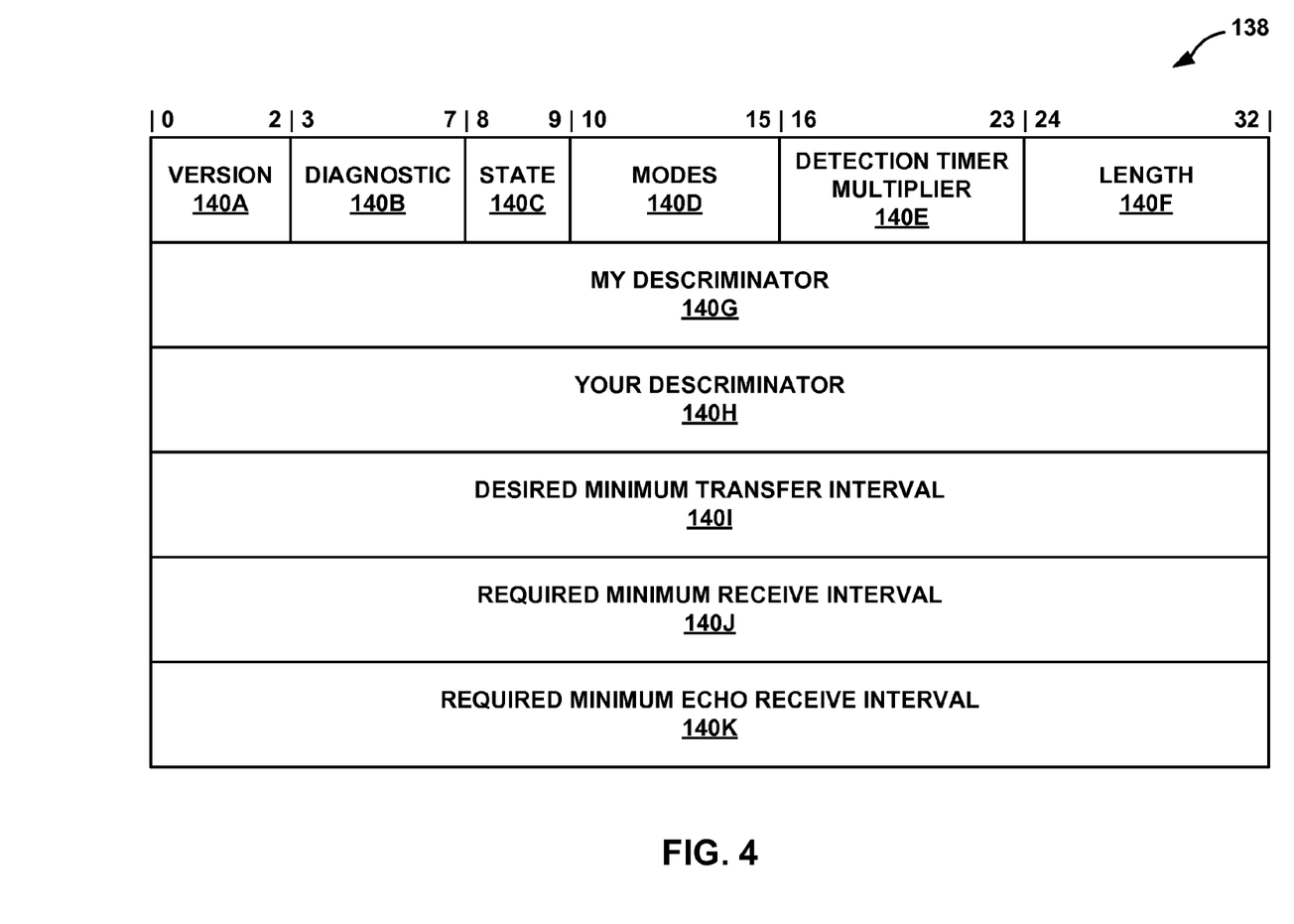
FIG. 4 is a diagram illustrating an exemplary BFD control message enhanced to carry additional information as to a status of an internal communication between a forwarding plane and a control plane of a router.

FIG. 4 is a diagram illustrating an exemplary BFD control message 138 that may be sent by a packet forwarding component of a router, e.g., router 12B of FIG. 1, with respect to liveliness detection of the forwarding plane within a network. In this example, control message 138 complies with the BFD protocol, such as BFD 28D of FIG. 2A, so that only certain changes need be implemented to the protocols executing on the sending or receiving forwarding components of the routers. Control message 138 therefore may be referred to below as "BFD control message 138." BFD control message 138 may further be formulated as a packet and receive the moniker of "BFD control packet 138." Again, although described in reference to the BFD protocol and BFD control message 138 in particular, the techniques may apply to any protocol that uses periodic messages to detect liveliness of the forwarding plane and that may be modified, as described herein, to also provide a status of internal communications between the forwarding plane and the control plane of the sending router.

In the example shown in FIG. 4, BFD control message 138 comprises 6 rows of 32 bits (0-31 across the top of BFD control message 138 in FIG. 3). BFD control message 138 further comprises fields 140A-40K ("fields 140"), where each of fields 140 may specify information relevant to specifying a response interval. Version field 140A, for example, specifies the version number of the protocol, which may enable the receiving router to determine whether it supports BFD control message 138. Diagnostic field 140B specifies a coded reason for the last session state change to states of "Down" or "AdminDown." State field 140C specifies the current BFD session state as seen by the router transmitting BFD control message 138. Typical, BFD session states comprises "AdminDown," "Down," "Init," and "Up." Modes field 140D comprises a number of bits, where each bit specifies a particular BFD session mode. For example, one bit of modes field 140D may specify whether the session requires authentication, e.g., whether the session is in "authentication mode."

Detection timer multiplier field 140E specifies a value that when multiplied by the value specified within desired minimum transfer interval 140I provides the detection time for the router transmitting BFD control message 138 in "asynchronous mode." Length field 140F specifies the length of BFD control message 138 in bytes. My discriminator field 140G specifies a unique, nonzero discriminator value generated by the router transmitting BFD control message 138. My discriminator field 140G may be used to demultiplex multiple BFD sessions between the same set of receiving and transmitting routers. Your discriminator field 140H specifies the discriminator received from the corresponding router of the particular BFD session. Your discriminator field 140H may specify a zero value, if the discriminator of received from the corresponding router is unknown by the transmitting router.

Desired minimum transfer interval field 140I specifies the minimum interval, in microseconds, that the local system would like to use when transmitting BFD control message 138 and subsequent BFD control messages. Required minimum receive interval field 140J specifies the minimum interval, in microseconds, between received BFD control messages that the router transmitting BFD control message 138 is capable of supporting. If the transmitting router sets required minimum receive interval field 140J to zero, the transmitting router does not want the remote or receiving router to send any periodic BFD control messages. Required minimum echo receive interval field 140K specifies the minimum interval, in microseconds, between received BFD echo messages that the transmitting router is capable of supporting. Specifying a zero to this field indicates that the transmitting router does not support the receipt of BFD echo packets.

A router, such as any of the routers of FIGS. 1-3, may therefore generate and output BFD control message 138. In general, the techniques described herein may use any mechanism for embedding information within BFD control message 138 to convey a status of internal communications between a forwarding plane and a control plane of the sending router, thereby providing an indication as to whether the forwarding information used by the forwarding plane is current or stale. In one example, the transmitting router utilizes one or more bits or sets one or more codes within diagnostic field 140B to convey this additional information. For example, BFD diagnostic codes may be defined as follow:

TABLE 1

| CODE WORD | MEANING |
| --- | --- |
| 0 | No Diagnostic |
| 1 | Control Detection Time Expired |
| 2 | Echo Function Failed |
| 3 | Neighbor Signaled Session Down |
| 4 | Forwarding Plane Reset |
| 5 | Path Down |
| 6 | Concatenated Path Down |
| 7 | Administratively Down |
| 8 | Reverse Concatenated Path Down |
| 9 | The forwarding component is using stale forwarding information base |

In the above example, an additional code word '9' has been defined for diagnostic field 140B to indicate that the forwarding component is using stale forwarding information.

As another example, a most significant bit within diagnostic field 140B may, for example, be set by the transmitting router to indicate whether the forwarding components of the transmitting router are currently in communication with the control plane components of the router, thereby utilizing current forwarding information. As such, the most significant bit may, in one example, be defined to convey information as follows:

TABLE 2

| CODE WORD | MEANING |
| --- | --- |
| 0 | The forwarding component is using a current forwarding information base (FIB) |
| 1 | The forwarding component is using stale forwarding information base |

For further information concerning the BFD protocol generally, BFD control message, and BFD control message fields, see the Internet Draft published by the Network Working Group of the Internet Engineering Task Force (IETF), titled "Bidirectional Forwarding Detection," written by D. Katz and D. Ward, and dated March, 2007, the entire contents of which are hereby incorporated by reference as if fully set forth herein.

Figure 5:
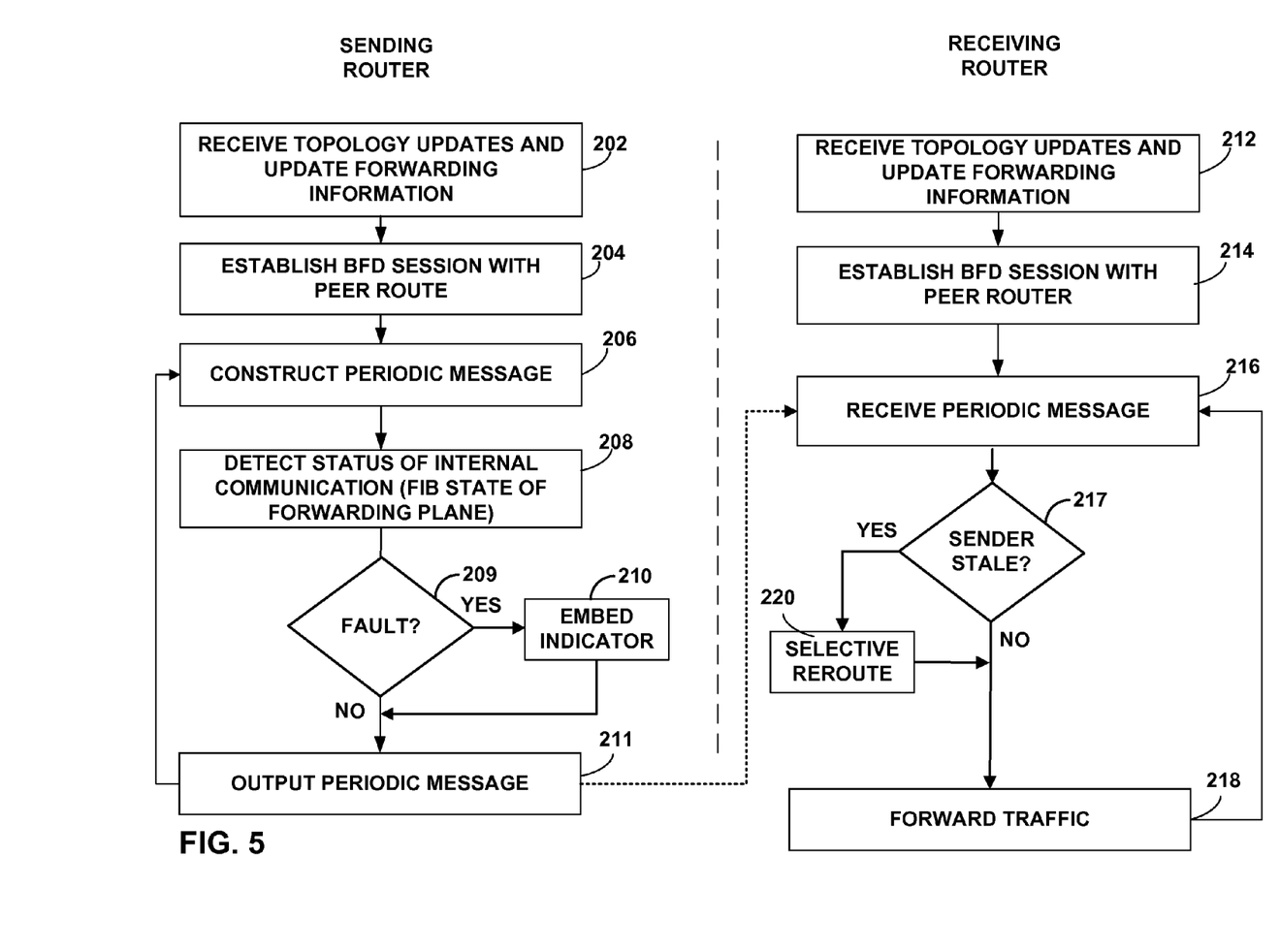
FIG. 5 is a flowchart illustrating example processes by which routers operate in accordance with one or more aspects of this disclosure.

FIG. 5 is a flowchart illustrating example operation of two routers in accordance with the techniques described here. For purposes of example, a first one of the routers is referred to as the "sending router" and a second one of the routers is referred to as a "receiving router."

In operation, control plane components of the routers receive control plane routing protocol messages from other routers and, in response, update topology information and perform route selection (202, 212).

In addition, the packet forwarding components of the routers establish a communication session in accordance with the forwarding-plane liveliness detection protocol, such as BFD (204, 214). The forwarding plane liveliness detection protocol may, for example, comprise a bidirectional forwarding detection (BFD) protocol. At this time, the two packet forwarding components of the routers begin exchanging periodic messages that, when received by the other router, provide an indication that the packet forwarding engines are operational and able to forward packets.

In the example of FIG. 5, the packet forwarding component of the sending router constructs a periodic message in accordance with the forwarding-plane liveliness detection protocol (206). At this time, the packet forwarding component of the sending router monitors (e.g., detects) the status of a communication link internal to the sending router that is used to convey communications between the routing component and the packet forwarding component of the sending router (208). As explained herein, internal communication between a forwarding component and a routing component may be lost, and therefore lead to stale forwarding information, in a variety of situations. For example, in situations where a router has a primary routing engine and one or more backup routing engine, situations may arise when all of the routing engines have failed or, in some cases, a backup routing engine is not in an operational state yet to takeover operation when the primary routing engine has failed. As another example, the routing engine(s) of the router may be undergoing an in-service software upgrade (ISSU), where loss of communication between the routing engines and the forwarding components may be considerable and, therefore, the router being upgraded may utilize non-stop forwarding in the forwarding plane using stale forwarding information for a significant period of time. As another example, an individual routing protocol process executing in the control plane may crash or otherwise terminate execution and, therefore, not able to update the forwarding information in the forwarding plane. Similarly, internal communication congestion between the control plane and forwarding plane may lead to loss of internal connectivity.

In the event the packet forwarding component detects a fault indicating that the packet forwarding component is no longer receiving updated forwarding information from the routing component, the packet forwarding component includes within the periodic message an indicator that the forwarding information within the forwarding plane of the sending router is stale (210). If no fault condition is detected, the packet forwarding engine does not include the indicator within the periodic message.

After construction, the packet forwarding component of the sending router outputs the periodic message to a peer network device in accordance with the forwarding plane liveliness detection protocol (211). The packet forwarding component of the sending router repeats this transmission at a high rate, such as every 1-10 ms to provide an indication of the operational status of the forwarding plane of the sending router.

Receipt of the periodic message by the packet forwarding component of the receiving router confirms to the receiving router that the packet forwarding component of the sending router is currently able to forward packets (216). In addition, the packet forwarding component of the receiving router further processes the received periodic message to detect whether the packet forwarding component of the packet forwarding engine of the sending router is no longer in internal communication with the control plane of the sending router (217). That is, the packet forwarding engine of the receiving router detects whether the packet forwarding engine of the sending router is currently forwarding packets using stale forwarding information, i.e., forwarding information that is not being internally updated by the control plane of the sending router.

If the forwarding information of the packet forwarding engine of the sending router is not stale, the receiving router continues to forward traffic without initiating a fast reroute operation (218).

However, if the packet forwarding engine of receiving router determines that the packet forwarding component of the sending router is no longer in communication with the control plane of the sending router, the packet forwarding engine of the receiving router may trigger a procedure to reroute one or more packet flows to bypass the sending router (220). For example, the receiving router may elect to reroute one or more packet flows immediately, such as high-priority packet flows. As another example, the receiving router may initiate a timer to track an amount of time the forwarding information of the packet forwarding component of the sending router has been stale without being updated by the control plane of the sending router. The receiving router may reroute different packet flows at different thresholds of time. For example, the receiving router may reroute a first set packet flows upon detecting that the amount of time exceeds a first threshold amount of time and may reroute a second set of packet flows upon when the amount of time exceeds a second threshold. During this process the receiving router continues to receive periodic messages received from the packet forwarding component of the sending network device and resets the time in the event communication between the packet forwarding engine and the control plane of the sending router has been restored.

In some examples, rerouting packet flows may be performed within the packet forwarding component of the receiving router. For example, control logic within forwarding ASICs of the packet forwarding component may initiate a fast reroute to redirect flows to different next hops. In other examples, the packet forwarding component may output a signal to the routing engine of the receiving router, causing the routing engine to select a new path and program the packet forwarding component. Example details for performing a fast reroute within a packet forwarding engine are described in U.S. Pat. No. 8,077,726, entitled "FAST REROUTE FOR MULTIPLE LABEL SWITCHED PATHS SHARING A SINGLE INTERFACE," the entire content of which is incorporated herein by reference.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable medium may cause a programmable processor, or other processor, to perform the method, e.g., when the instructions are executed. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:
1. A method comprising:
executing, within a routing component of a network device, one or more routing protocols to exchange network topology information with one or more other network devices and to program a packet forwarding component of the network device to forward packets in accordance with the network topology information;

detecting, with the packet forwarding component, a status of internal communication between the packet forwarding component of the network device and the routing component of the network device;

constructing, with the packet forwarding component, a periodic message in accordance with a forwarding plane liveliness detection protocol;

setting, within the periodic message, a code word providing an indication of the detected status of the internal communication between the routing component and the packet forwarding component of the network device; and outputting, by the packet forwarding component, the periodic message to a peer network device in accordance with the forwarding plane liveliness detection protocol.

2. The method of claim 1, wherein detecting a status of the internal communication comprises detecting failure of the internal communication between the packet forwarding component and the routing component, and wherein setting, within the periodic message, the code word comprises setting one or more bits within the periodic message to indicate that the internal communication between the packet forwarding engine and the routing component has failed and that forwarding information within the packet forwarding component has become stale and is not currently being updated by the routing component.

3. The method of claim 2, wherein detecting failure of the internal communication between the packet forwarding component and the routing component comprises:

receiving, with the packet forwarding component, keep alive messages from the routing component over a communication link internal to the network device; and detecting, with the packet forwarding component, a failure to receive, within a time period, a subsequent keep alive message from the routing component on the internal communication link.

4. The method of claim 2, detecting failure of the internal communication between the packet forwarding component and the routing component comprises receiving, with the packet forwarding component, a command from the routing component indicating an impending loss of communication between the routing component and the packet forwarding component.

5. The method of claim 1, establishing, within the packet forwarding component of the network device and in accordance with the forwarding plane liveliness detection protocol, a communication session with a forwarding component of the peer network device that is communicatively coupled to the network device.

6. The method of claim 1, further comprising:

receiving, by the packet forwarding component of the peer network device, the periodic message;

detecting, with the packet forwarding component of the peer router and based on the indication within the periodic message, whether the packet forwarding component of the network device that output the periodic message is no longer in communication with the routing component of the network device; and responsive to determining that the packet forwarding component of the network device that output the periodic message is no longer in communication with the routing component of the network device, rerouting one or more packet flows to bypass the network device.

7. The method of claim 6, wherein rerouting one or more packet flows to bypass the network device comprises:

initiating, with the peer network device, a timer to track an amount of time the forwarding information of the packet forwarding component of the network device has been stale and has not been updated by the routing component of the network device; and rerouting the one or more packet flows upon detecting that the amount of time exceeds a threshold amount of time and that periodic messages received from the packet forwarding component of the network device indicate that internal communication with the routing component has not been restored.

8. The method of claim 1, wherein the forwarding plane liveliness detection protocol comprises a bidirectional forwarding detection (BFD) protocol.

9. A network device comprising:

a routing component having a hardware-based processor to execute one or more routing protocols to exchange network topology information with one or more other network devices;

a packet forwarding component of the network device programmed by the routing component to forward packets in accordance with the network topology information; and a communication link internal to the network device for conveying communications between the routing component and the packet forwarding component, wherein the packet forwarding component constructs a periodic message in accordance with a forwarding plane liveliness detection protocol, wherein the packet forwarding component detects a status of the internal communication link and sets, within the periodic message, a code word providing an indicator of the detected status of the communication link between the routing component and the packet forwarding component of the network device and whether forwarding information within the packet forwarding component has become stale and is not currently being updated by the routing component, and wherein the packet forwarding component outputs the periodic message to a peer network device in accordance with the forwarding plane liveliness detection protocol.

10. The network device of claim 9, wherein the packet forwarding engine detects a status of the communication link by receiving, with the packet forwarding component, keep alive messages from the routing component over the communication link internal to the network and detects a failure to receive, within a time period, a subsequent keep alive message from the routing component on the internal communication link.

11. The network device of claim 9, wherein the packet forwarding engine detects failure of the internal communication between the packet forwarding component and the routing component by receiving, with the packet forwarding component, a command from the routing component indicating an impending loss of communication between the routing component and the packet forwarding component.

12. The network device of claim 9, wherein the forwarding plane liveliness detection protocol comprises a bidirectional forwarding detection (BFD) protocol.

13. A network device comprising:
a routing component having a hardware-based processor to execute one or more routing protocols to exchange network topology information with one or more other network devices; and
a packet forwarding component of the network device programmed by the routing component to forward packets in accordance with the network topology information;
wherein the packet forwarding component executes a forwarding plane liveliness detection protocol to receive a periodic message from a peer network device,
wherein the periodic message comprises an indicator of a status of communication between a routing component and a forwarding component of peer network device, and
wherein the packet forwarding component reroutes one or more packet flows to bypass the peer network device when the indicator within the periodic message indicates that the forwarding component of the peer network device is no longer in communication with the routing component of the peer network device.

14. The network device of claim 13,
wherein the packet forwarding component comprises control logic that, responsive to the code word within the periodic message providing and indication that the forwarding component of the peer network device is no longer in communication with the routing component of the peer network device, initiates a timer to track an amount of time the forwarding information of the packet forwarding component of the peer network device has become stale without being updated by the routing component of the peer network device, and
wherein the packet forwarding component reroutes the packet flows when the amount of time exceeds a threshold amount of time even though periodic messages continue to be received from the peer network device.

15. The network device of claim 14,
wherein the packet forwarding component resets the timer without re-routing the packet flows when the indicator of one of the periodic messages indicates that communication between the packet forwarding component of the peer network device and the routing component of the peer network device has been restored.

16. The network device of claim 13, wherein the forwarding plane liveliness detection protocol comprises a bidirectional forwarding detection (BFD) protocol.

* * * * *